United States Patent [19]
De Rivas

[11] 3,824,448

[45] July 16, 1974

[54] CONTACT POTENTIAL GENERATOR SYSTEM

[75] Inventor: Eduardo Villasenor De Rivas, Los Angeles, Calif.

[73] Assignee: Rene Villasenor De Rivas, Los Angeles, Calif.

[22] Filed: Dec. 21, 1972

[21] Appl. No.: 317,275

[52] U.S. Cl............................ 322/2, 310/4, 310/8.1, 310/8.6, 321/1.5
[51] Int. Cl..................................................... H02n
[58] Field of Search .............. 310/4, 8.1, 8.6, 2, 5, 310/6; 322/2; 321/1.5; 318/116

[56] References Cited
UNITED STATES PATENTS

| | | | |
|---|---|---|---|
| 3,079,515 | 2/1963 | Saldi ................................... | 310/4 |
| 3,093,757 | 6/1963 | Lederer ............................... | 310/4 |
| 3,163,783 | 12/1964 | Howatt et al. ..................... | 310/8.6 |
| 3,202,843 | 8/1965 | Hurst ................................... | 310/4 |
| 3,271,622 | 9/1966 | Malagodi et al. ................. | 310/8.1 X |
| 3,396,327 | 8/1968 | Nakazawa.......................... | 310/9.8 X |
| 3,399,314 | 8/1968 | Phillips .............................. | 310/8.6 X |
| 3,489,931 | 1/1970 | Teaford .............................. | 310/8.1 |
| 3,590,287 | 6/1971 | Berlincourt et al.............. | 310/8.6 X |

*Primary Examiner*—D. F. Duggan
*Attorney, Agent, or Firm*—Harris, Kern, Wallen & Tinsley

[57] ABSTRACT

A contact potential generator comprising a ferro-electric generator excited into operation and maintained at that state to produce a useful output signal by the power input of an ignition section consisting of a battery of infrared radiation and beta radiation converter cells. The radiation converter cells utilize the contact potential difference of their electrodes to convert infrared radiation and beta radiation into electric power.

6 Claims, 9 Drawing Figures

CONTACT POTENTIAL GENERATOR SYSTEM

This invention relates to photoelectric energy converters and to a method of converting infrared radiation and isotope beta radiation into electric power.

This invention also relates to the conversion of electric field energy and piezoelectric energy into electric power.

Electric generators have many uses. There are uses in factories, utility houses, ships, communications, space exploration, vehicles, and numerous other uses. Electric power is important to human survival and to the continuation of our western civilization. Fuel cost, maintainance cost, weight, fuel scarcity or abundance and operating life are important prerequisites for the selection of an electric generator.

Existing electric generators have many disadvantages. Some are, for example, dependent upon limited fuel and at the same time depend upon continual attention to renew their fuel input. Others are dependent upon large amounts of radioactive fuel and in most instances cause heat and radioactive waste pollution. Most generators cannot be adopted to many uses because of starting time, fuel used, size, weight and output power produced.

It is the object of this invention to provide a generator which can be for universal applications because of its power output per weight ratio, fuel or energy used, size and starting time.

Another object of this invention is to provide a generator that is inexpensive to manufacture and operate and which will function reliably over a wide range of temperatures without polluting its environment.

SUMMARY OF INVENTION

The generator of the invention provides a means for converting infrared energy, beta energy and piezoelectric energy into electric power. Briefly, the generator includes infrared radiation sensitive cells for converting into electric power all infrared photons incident on their semiconductor wafers. The cells also convert beta radiation emitted from its cathodes into electric power. Power produced by the cells is converted from direct current to two frequencies by two oscillators. One oscillator produces a low-frequency signal (60 cps) and the other oscillator, a high-frequency signal which reduces the internal impedance of a ferroelectric current-voltage generator and controls the current output of the ferroelectric current-voltage generator. In this regard, the high- and low-frequency signals are fed into the input leads of the ferroelectric current-voltage generator. The ferroelectric current-voltage generator converts the mixed frequency input and its internal piezoelectric energy into high voltage and current. This output is fed into a frequency selector which is turned to a resonant frequency of the low-frequency signal. From the mixed frequency input the selector selects low-frequency signal and amplifies it before it is extracted by a load.

DESCRIPTION OF INVENTION AND DESCRIPTION OF DRAWINGS

Total System

Figure 1:
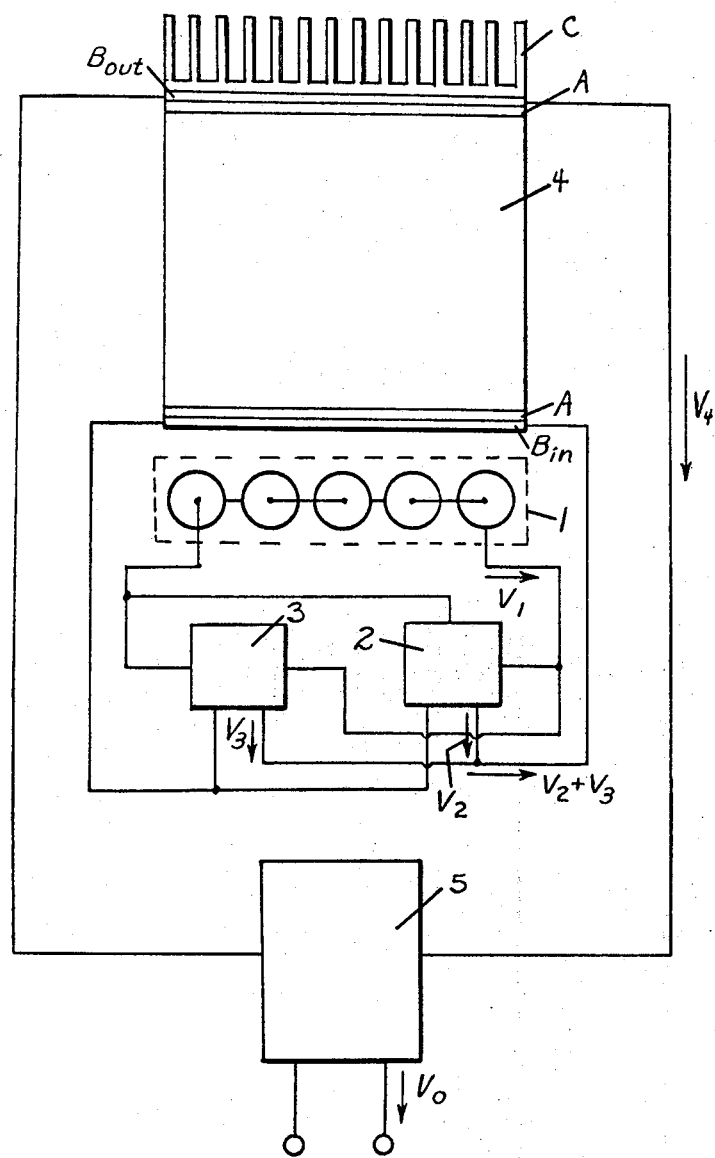
FIG. 1 is a general schematic of the complete generator system.

Looking at FIG. 1, we can see the general schematic of the contact potential generator. 1 represents the ignition unit. The ignition unit produces a D.C. signal $V_1$. 2 represents the low-frequency oscillator, which is connected to the output of the ignition unit 1, from which it receives part of the signal $V_1$. Oscillator 2 produces a 60 cps signal. A high-frequency oscillator 3 is also connected to the output leads of the ignition unit. The output of oscillator 3 is used to reduce the internal impedance of a ferroelectric current-voltage generator 4 (to be called curvolt generator in the rest of the description). Total output $V_2$ and $V_3$ of the oscillators, 2 and 3, is fed into the curvolt generator 4. The total power output of the curvolt generator $V_4$ is fed to a frequency selector 5. The frequency selector 5 selects the original 60 cps signal and inputs this power to $V_o$ to an external load.

The contact potential generator should be a constant voltage generator. It also will be a constant current generator when its internal resistance is higher than the total resistance of the load it powers.

DETAILED DESCRIPTION OF CONTACT POTENTIAL CELL

Figure 2:
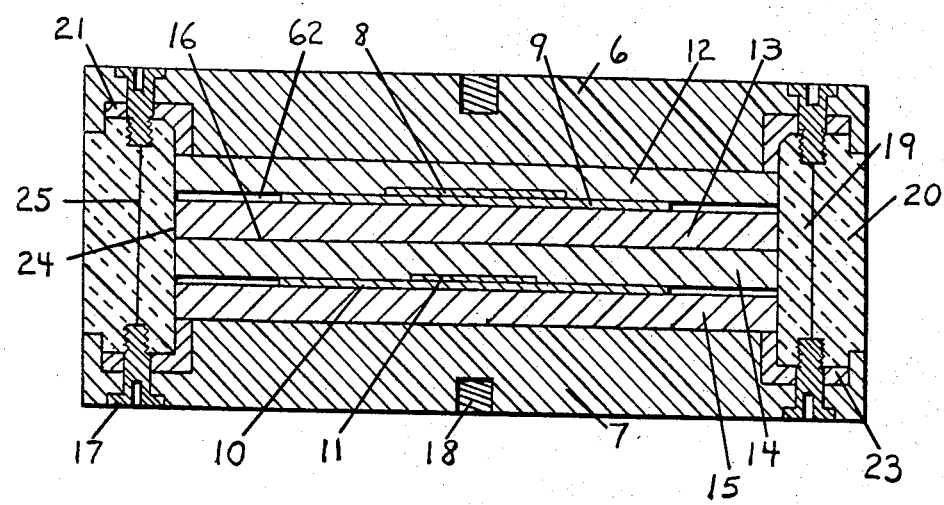
FIG. 2 is a cross-sectional view of one of the cells of the battery of cells in the ignition system for the generator.

Looking now at FIG. 2, we can see the cross-sectional side view of one contact potential cell from the ignition section. This cell forms a battery of cells which comprise the ignition unit. The cell consists of an upper and a lower cell unit and each unit consists of a cathode and an anode electrode and a semiconductor disc wafer therebetween. In the upper cell unit, the cathode is depicted by the numeral 12 and the anode by the numeral 13. 14 and 15 are the cathode and anode electrodes for the bottom cell unit. In the upper cell unit the wafer is depicted by the numeral 9, while the wafer in the lower cell unit is depicted by the numeral 10. In addition to the foregoing, the upper and lower cell units include discs of radioactive material 8 and 11 respectively.

Before continuing further and before entering into a detailed description of the ignition cell, a brief review of the meaning of "fermi level" and "work function" is needed.

Fermi level is the highest energy level occupied by electrons in the energy scale of a metal at 0°K. At 0°K, energy levels below fermi level are filled and energy levels above fermi level are empty. At higher temperatures than 0°K, electrons from the fermi level and levels below fermi level, populate higher energy levels. In other words, the region of partially occupied levels at the border between filled and empty levels increases with increasing temperature. Energy levels in a metal are analogous to the energy levels of an atom.

The work function is the difference between the energy required for an electron to leave the metal and the fermi level. This work function is analogous to the ionization potential of an atom.

When two different metal electrodes such as calcium and nickel are contacted electrically, there is a net flow of electrons from the lower work function and higher fermi level calcium electrode to the nickel electrode of higher work function and lower fermi level. Equilibrium will exist when the fermi levels are in equilibrium and electron flow will stop. Before equilibrium, electron fermi level in calcium is higher in the energy scale than the lower fermi level of nickel. Hence, the calcium electrode will be positive and the nickel electrode will be negative, as a result of the extra electrons gained from the calcium electrode.

The anode electrodes 13 and 15 and the cathode electrodes 12 and 14 are made of dissimilar metals which differ greatly in the energy required to liberate an electron from them. Anodes 13 and 15 have a lower work function and a higher fermi level than cathodes 12 and 14. The difference in work function between cathode 12 and anode 13, and cathode 14 and anode 15 is called the contact potential difference $V_w$, known as $$V_w = E_{w_c} - E_{w_a}$$

where $E_{w_c}$ is the work function of the cathode (12 or 14) and $E_{w_a}$ is the work function of the anode (13 or 15).

Upon electrical connection of the anode 15 and cathode 12, a flow of electrons from anode 15 to cathode 12 through the closed external circuit will occur. Another electron flow will be from anode 13 to cathode 14. Simultaneously, at equilibrium of fermi levels, a static electric field will form between anode 13 and cathode 12, and between cathode 14 and anode 15. Rectifying junctions at the cathode-semiconductor and anode-semiconductor interfaces will allow only omnidirectional negative current to flow from the cathode (12 or 14) through the semiconductor wafer (9 or 10) and to the anode (15 or 13), and then back to the cathode (12 or 14).

The electric field produced by the contact potential is $$E = V_{w/d}$$

where d is the separation distance of the electrodes.

At the semiconductor wafer 9, incident infrared photons of sufficient energy and the kinetic energy of beta particles emitted from radioactive wafer 8, will produce electron hole pairs. Charge carriers produced will migrate to their respective electrode of opposite charge.

Ionizing energy of incident infrared photons and beta particle kinetic energy in the upper cell unit are transferred to the lower cell unit when the electrons produced by ionization and beta particles reach anode 13. The same ionizing energy is utilized by the external circuit when holes reach cathode 12.

Electrons reaching anode 13 will migrate to cathode 14 through the cathode-anode interface. At cathode 14, electrons will recombine with holes produced at semiconductor 10 by incident infrared photons and beta particle kinetic energy of radioactive wafer 11. Electrons produced at semiconductor 10 will migrate to anode 15. From anode 15 they will migrate through the external circuit to recombine with holes produced at semiconductor wafer 9.

Beta particles emitted from 8 and 11 will produce voltage $V_B$ by the constant charging of anode 13 and 15, respectively. Like the free electrons produced by ionization at semiconductor wafers 9 and 10, beta particles, since they are negative charge carriers, will migrate in the same direction of the negative current. Voltage produced by beta radiation is $$V_B = R_T I_P$$

where $R_T$ is the total resistance of the load and the resistance of the cell, and $I_P$ is the primary beta current emitted from wafers 8 and 11.

As previously mentioned, anodes 13 and 15 have a lower work function and a higher fermi level than the cathodes 12 and 14. At the same time, the anodes 13 and 15 are inherently more electropositive than the cathodes 12 and 14.

The metal forming the anodes 13 and 15 should be either calcium, strontium, magnesium or any other metal in the first and second group of elements of the periodic table. Alloys where the first and second group of elements of the periodic table are employed as the base also can be used. Calcium is a recommended metal to be used for both anode 13 and anode 15. It has a low work function and is strongly electropositive.

The metal forming the cathodes 12 and 14 should have a higher work function than the anode metal. This means any metal or alloy that can give contact potential difference of more than one electron volt when contacted electrically with the anode. For example, the potential between calcium, of work function of 2.6 ev and either nickel, work function of 4.84 ev, or rhenium, work function of 4.9 ev, or platinium, work function of 5 ev. will be minimum 2 ev. The contact potential difference between magnesium of 3.6 ev work function and either rhenium, nickel or platinimum will give a minimum 1.2 ev. Nickel is recommended for the cathode 12 and 14.

Cathode 12 and 14 of both cell units should be of the same metal, such as nickel, and anodes 13 and 15 should be of the same metal, such as calcium.

Figure 3:
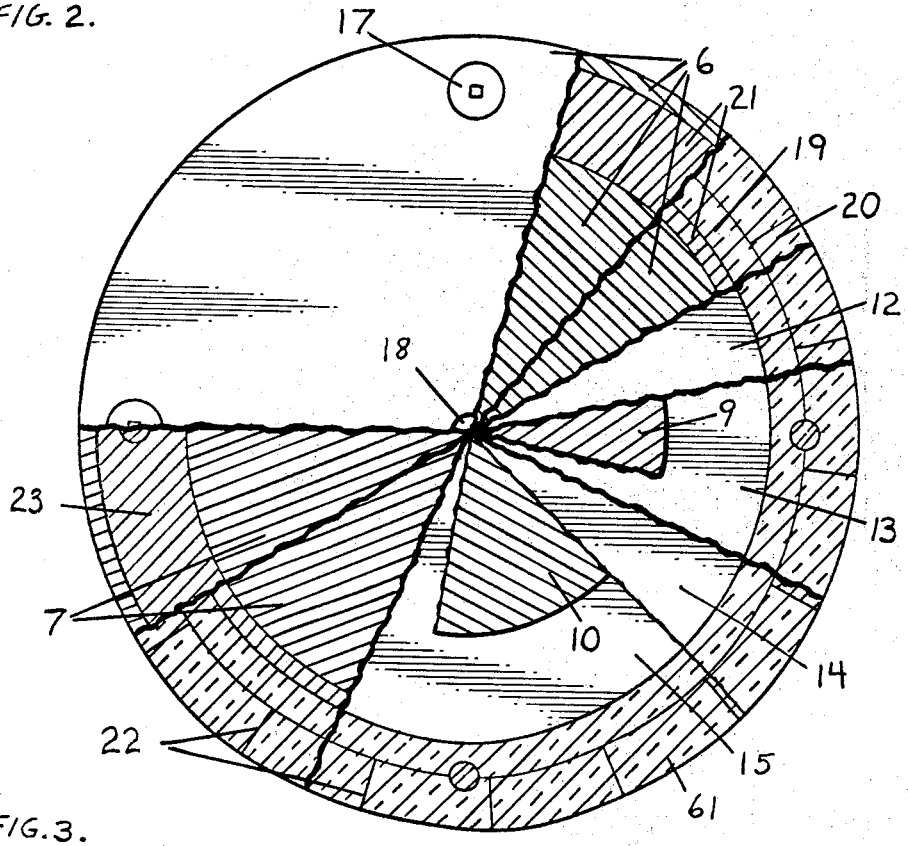
FIG. 3 is a fragmentary sectional view of the cell of FIG. 1, broken away at different levels to show different layers of components in the cell.

Electrodes 12, 13, 14, and 15 are shown in FIG. 3. 12 and 13 are the electrodes for the upper cell unit and in and 15 are the electrodes for the lower cell unit.

As previously mentioned, the semiconductor wafers 9 and 10 function as electrical converters for beta radiation emitted from the radioisotope discs 8 and 11, and infrared radiation, emitted from the cells environment, including its electrodes. In this regard, the semiconductor wafers 9 and 10 are between the electrodes 12 and 13, and 14 and 15 respectively, and are centered, as shown in both FIG. 3 and FIG. 2. The semiconductor wafers 9 and 10 are directly under the thin disc of radioactive material, carbon 14, 8 and 11, as shown in FIG. 2. The upper cell unit semiconductor wafer 9 is thinner than the bottom cell unit semiconductor wafer 10, in order to allow more beta particles emitted from the carbon 14 disc 8 to pierce the wafer 9 and reach anode 13.

Preferably, the intrinsic (undoped) and infrared transparent semiconductor wafer used for the upper cell unit is selected to be sensitive to the shorter wave lengths of the micrometer region in the infrared spectrum. A suggested intrinsic semiconductor is germanium, although other semiconductors of the same parameters of germanium may also be used. The lower cell unit intrinsic and infrared radiation transparent semiconductor 10 should be sensitive to the longer wavelengths in the micrometer region of the infrared spectrum. The suggested semiconductor for this purpose is indium-antimonide, InSb, because it has a band gap of .2 electron volts and a high charge carrier mobility, in meters $^2$/V-sec. By using two semiconductors with two different wavelength peak sensitivities, the cell can convert incident photons of almost the complete infrared spectrum into electric power. For example, photons of an energy of .3 ev can only produce an electron hole pair in the semiconductor of a band gap of .2 ev.

Electrodes 12, 13, 14, and 15 are radially enclosed by an encasement consisting of top disc terminal 6 and bottom disc terminal 7, and the assembly of infrared transparent plastic or glass rings, depicted by numerals 19 and 20 in both FIG. 3 and FIG. 2. The cell encasement is kept together by the nylon screws 17. Disc terminals 7 and 6 have one screw socket for electrical connection as shown in FIGS. 2 and 3, number 18.

Cathode 12 and anode 15 are soldered to their respective disc terminals 6 or 7, to form an omic contact, as shown in FIG. 2.

The electrodes 12, 13, 14, and 15 are sealed in vacuum, by the silicon seal rings 23 and 21, shown in both FIGS. 2 and 3 and the rest of the encasement. It should be noted there are four nylon screws 17 in the top disc terminal 6 and four screws in the bottom disc terminal 7. The paired disc terminals are of aluminium or magnesium or the derivate alloys of the above metals. These metals are used since they are lightweight and aluminium is an excellent conductor. Thus, any metal or alloy may be used.

Cathode 14 and anode 13 are electrically connected by just contacting both metals by pressure. These two electrodes will serve as electric field maintainers of the cell units.

Both units operate the same way, so further description will be referred to both cell units by referring singularly when necessary.

Operatively, the capacitance of the top cell unit, due to closer spacing of its electrodes 12 and 13 compared to electrode spacing and wafer thickness of the second unit, will be greater than the bottom cell unit. Thickness of wafer 9 will be only 2 mils, compared to InSb wafer 10 which is 10 mils thick. The top cell unit will thus have greater contact potential field intensity than the lower cell unit's electrodes 14 and 15.

Energy stored in the electric field between any two electrodes (12 and 13 and 14 and 15) is expressed as $$U = \tfrac{1}{2} CV^2 = \tfrac{1}{2} QV$$

where
$C = e (L - x)/d + E° e^1 x/d$

X = area of wafer
L = area of paired electrodes
d = distance between electrodes
$e^1$ = dielectric coefficient
E° = permittivity of free space
V = contact potential difference Charge stored in the electrodes 12 and 13 or 14 and 15 is Q = CV. Therefore, more charge will be stored by electrodes 12 and 13.

Structurally, it should be noted that both major faces of the semiconductors 9 and 10 will be cleaned by ionic bombardment in a vacuum. After ionic bombardment cleaning, one surface will absorb from vapor an atomic monolayer of cesium. although other electropositive elements can be used, such as the heavy elements in the first and second group of the periodic table. This layer of cesium will reduce the work function of the treated surface to 1.8 ev, which is less than the calcium electrodes work function of 2.6 ev. The opposite semiconductor surface 9 and 10, which is shown in FIG. 3, absorbs a monolayer of either iodine, sulfur, selenium or teluirium or combinations thereof, although other elements can be used that produce the same effect. This atomic monolayer will produce a higher work function than the cathodes. The atomic monolayer films will be inspected for evenness and quality so that the desired work function is even throughout the surface of the semiconductor wafers 9 and 10. Both major surfaces of the semiconductor wafers are flat polished (lapped) before any film is applied.

Elements on the treated low work function surface will act as surface donors so that the surface will have a higher density of electrons than the interior of the semiconductor 9 and 10. The effect will be a lowering of the work function. Electrons emitted from the semiconductor will be repelled from the surface by the concentration of electrons in that surface. The opposite effect will be present on the treated high work function surface.

The calcium anodes 13 and 15 and nickel cathodes 12 and 14 will be cleaned by ionic bombardment or by similar means that will given similar or better results after they have been given a high, flat polish (lapped) of a tolerance of less than 0.0001 inch. The edges of electrodes 12, 13, 14, and 15 will be blackened by a film of carbon. Carbon is used since it has a high absorption coefficient.

The complete cell will be finished and sealed in a vacuum. The vacuum cavity left after sealing is shown in FIG. 2 and depicted as numeral 62.

Turning again to FIGS. 2 and 3, the assembly of infrared transparent plastic or glass rings 19 and 20, radially surrounding the electrodes 12, 13, 14, and 15, will transmit infrared radiation toward the center of the cell by a series of mirrors, a film, and two layers of the same glass or plastic. The outer surface of the first ring will be coated with a high refractive index for infrared radiation chemical or element such as germanium or cesium iodide. The first ring 20 is an assembly of eighteen mirrors 22. The mirrors 22 are thin films of aluminium deposited on the sides of each segment 61, as shown in FIG. 3, represented by numeral 22. The complete assembly of eighteen segments, 61, when assembled and positioned in the cell will form the outer ring 20. Ring 19 will receive and transmit and finally refract infrared radiation refracted and reflected by the first ring 20.

The line of deflection 25 in FIG. 2 is the ring 20-ring 19 interface.

Infrared radiation incident on the electrode edges will be absorbed by the film of carbon 24.

Infrared radiation reaching the electrode major surfaces will be reflected by the polished faces of the electrodes 12, 13, 14, and 15, toward the semiconductor wafers 10 and 9.

Operatively, the difference in work function of the wafers 9 and 10 with anodes 15 and 13 and cathodes 14 and 12 will form junction space charges or charge barriers at the junctions when the circuit is opened. Upon contact, the difference in work function between anode and semiconductor wafer where the anode's work function is higher than the wafer's, will result in an exchange or flow of electrons from the wafer to the anode. This flow will stop when there is an equilibrium of charges on both bodies and a resultant space charge barrier is formed. Gained electrons will be at the anode surface and holes in the semiconductor surface. The potential of this charge barrier is the difference in work function of the anode 13 or 15 and the wafer 9 or 10. The anode-wafer interface will be a rectifying junction allowing only omnidirectional negative current from the wafer to the anode.

The same effect will take place at the wafer-cathode junction but the transfer or flow of electrons will result from the cathode 12 or 14 to the wafer 9 or 10, as a result of the greater work function of the wafer surface. The cathode-wafer interface will also be a rectifying junction allowing only omnidirectional negative current to flow from the cathode across the interface to the wafer.

Operatively, the electric field of the electrodes 12, 13, 14, and 15 produced by the contact potential difference will reduce the height of the space charge barrier present at the cathode-wafer junction and anode-wafer junction by $Ed/d$ or $eV$. As a result of this reduction, the flow of electrons from the cathode 12 or 14 to the anode 15 or 13 through the wafer 9 or 10 will be facilitated. Flow of electrons in the opposite direction (negative x direction) from the wafer 9 or 10 to the cathode 12 or 14 will face the original barrier height of the space charge and a higher resistance than the electrons flowing in the positive direction. The following expression applies for the net current in the positive direction (cathode to anode):

$$I_{j_{c_s}} = I_m (e^{eV/k_B T} - )$$

$$I_m = A A_o T^2 exp(-E_{w_S} - E_{w_C}/k_B T)$$

Where
$k_B$ = Boltzmann constant
$A$ = cross sectional area of junction
$A_o = 120$ AMPS/cm² − K²
$T = °K$
$E_{w_s}$ = work function of wafer surface at cathode-semiconductor junction
$E_{w_c}$ = cathode work function
Net current for the anode-wafer junction, $I_{j_{As}}$ is $$I_{j_{AS}} = I_S (e^{eV/k_B T} - 1)$$

$$I_S = A A_o T^2 exp(-E_{w_A} - E_{w_s}/k_B T)$$

$E_{w_s}$ = wafer surface work function at anode-semiconductor junction
$E_{w_A}$ = anode work function
The resistance of the junctions for one cell unit is $$R_J = V/I_{j_{AS}} + V/I_{j_{CS}}$$

The contact potential field will not be able to produce electric power without the extra energy from incident infrared photons and the supplementary energy of energetic beta particles emitted from radioactive carbon 14 discs 8 and 11.

Infrared energy, incident on semiconductor wafers 9 and 10 is emitted at ambient temperatures by every object at varying wattages. Infrared radiation from a perfect emitter called a black-body will emit .09 watt/cm²/sec at 300°K. Current generated by infrared radiation will stop if the cell environment is at 0°K. Part of the infrared radiation utilized by the wafers 9 and 10 will be emitted by the electrodes 12, 13, 14, and 15.

The thickness of the semiconductor wafers 9 and 10 will be of great importance because the collection efficiency of the electrodes 12, 13, 14, and 15 will depend upon the thickness of the semiconductor wafer 9 or 10, the electric field, the drift velocity of the charge carriers and the average lifetime of an electron-hole pair. Therefore, the thickness of wafers 9 and 10 should be less than the average traverse length of the slowest charge carrier, usually a hole. The traverse length is given by equation $$d = (U_h E t_p)^{1/2}$$

where
$t_p$ = average lifetime
$U_h$ = drift mobility of a hole
$E$ = electric field
The recommended wafer thickness is $$l = (t_p u_h [V_w/(u_h t_p)^{1/2}/2])^{1/2}$$

Functionally, the upper cell unit anode 13 and lower cell unit cathode 14 will function as electric field maintainers, since they will be able to transfer charges directly, compared to anode 15 and cathode 12 which depend upon a closed circuit to be able to transfer charges. At the open circuit mode, the two middle electrodes 13 and 14 will exchange charge carriers due to their difference in work function and electron fermi levels. The net electron flow will be from the upper cell anode 13 through the cathode-anode interface, and to the lower cell unit cathode 14 which has a higher work function and lower fermi level. Both electrode surfaces in the cathode-anode interface are highly polished and perfectly flat. At electron energy equilibrium, the anode 13 will be positively charged and cathode 14 negatively charged. An electric field will result from the charges on the middle electrodes. This resulting field will give rise to a small current. This small current will cease when the cell reaches equilibrium if the cell is still in open circuit mode.

The maximum voltage produced by one cell from its electrodes will equal the sum of the contact potential difference of the lower and upper cell units at open circuit mode.

Adjacent cathode 12 is radioactive wafer 8 consisting of a one curie radioactive carbon 14 beta emitter. At adjacent cathode 14, is radioactive wafer 11 consisting of the same isotope although other isotopes similar to tritium can be used, but in much less amounts. The ratio should be 1/1000. Cathode 14 will contain on its surface a carbon 14 thin disc 11 of .001 curie.

As a result of the greater amount of beta emission from carbon 14 disc 8 which is radially coextensive with cathode 12 and wafer 9, and the thinness of wafer 9, more beta particles will be captured by anode 13. In comparison, anode 15 will collect less beta particles as a result of greater semiconductor wafer thickness and less beta particles are emitted from carbon 14 disc 11. The exposed surfaces of the carbon 14 discs 8 and 11 adjacent the wafer surfaces are coated with a thin layer of the same metal as their adjacent cathode.

Voltage is produced by the beta radiation from radioisotope carbon 14 disc wafers 8 and 11, as shown in FIG. 2, by the constant charging of the collection electrodes 13 and 15.

Collection anode 13 will be maintained positive in relation to cathode 14 by the contact potential difference of anode 13 and cathode 14. Before any negative charge carrier reaches anode 13, anode 13 and cathode 14 fermi levels will be at equilibrium. When a negative charge carrier reaches anode 13, the fermi level equilibrium will be disrupted. To be able to reach equilibrium again, the negative charge carrier, be it a beta particle or an electron, will flow to cathode 14 which is more electronegative than anode 13. If there is a continued flow of negative charge carriers to anode 13, there will be a constant flow of those carriers to cathode 14 in order to maintain fermi level equilibrium constant.

Note also that electrons reaching anode 13 and 15 from their respective wafer cannot return to cathodes through the wafer but only through the external load as a result of the rectifying junctions at the anode-wafer interface and cathode-wafer interface which allow only omnidirectional negative current from the cathode through the semiconductor wafer and to the anode. Therefore, if the cell is maintained at open circuit mode, voltage produced by beta radiation will increase constantly until the rectifying junctions of the cell break down.

At closed circuit mode, primary beta current will give a voltage $V_\beta$. The voltage is found through the following expression:

$$V_\beta = I_p R_T$$

where $R_T$ is the total resistance of the cell and the external load and $I_p$ is the primary beta current emitted from carbon 14 wafers.

The amount of electron pairs produced by the beta particles is $N_\beta = E_{\beta_0} - E_\beta /E_G$, where $E_{\beta_0}$ is the average energy per beta particle, $E_\beta$ is the net amount of energy left on the beta particle after piercing the semiconductor wafer and $E_G$ is the minimum amount of energy needed to produce an electron hole pair.

Generally, the cell is a constant voltage source. Constant voltage in the rest of the description will be called circuit voltage $V_c$ which is equal to $V_\beta + V_{w_1} + V_{w_2}$, where $V_\beta$ is the voltage produced by beta radiation, $V_{w_1}$ is the contact potential difference of the upper cell unit, and $V_{w_2}$ is the contact potential difference of the lower cell unit.

When current is allowed to flow, the voltage between terminals of the cell will decrease from the circuit voltage $V_c$, but circuit voltage $V_c$, which is the electromotive force, will remain the same. This voltage drop between terminals is similar to the voltage drop across a resistor. The internal resistance of the cell will cause a small voltage drop. The amount of terminal voltage drop is $$V = V_c - i\nu$$

where $i$ is the current output and $\nu$ is the internal cell resistance which is equal to the resistance $\nu_j$ of the junctions and the total resistance $\nu_s$ of the semiconductor wafers 9 and 10. Resistance of the semiconductor wafers is shown in the following expression $$\nu_s = [E/N_2\ Ee\ (\mu_e + \mu_h)]l_2/A_2 + [E/N_1\ Ee\ (\mu_e + \mu_h)]l_1/A_1$$

where
N = density of electron-hole pairs equal to $N_{ph}/1A$, where $N_{ph}$ is the number of electron-hole pairs produced
$l$ = thickness of semiconductor wafer
A = area of one of the major surfaces of the wafer (9 or 10)
E = electric field
$\mu_e$ = electron mobility
$\mu_h$ = hole mobility
and subscripts
1 = of upper cell unit
2 = of lower cell unit
the current output of the cell is $$I_{T_c} = V_c/R_L + \nu_j + \nu_s$$

where
$V_c = V_B + V_{w_1} + V_{w_2}$
the wattage output is $$W = I_{T_c} V_c$$

When internal resistance of the cell is negligible $V = V_c$, where
V = terminal voltage
$V_c$ = circuit voltage
The terminal voltage and electric field relationship is shown below $$E = E_o - V/d$$

Where $E_o$ is the peak field when terminal voltage is zero, and V is the terminal voltage and d is the electrode separation in the above equation, terminal voltage V depends upon the amount of electrons gained by the anode (13 or 15) from the semiconductor wafer minus the amount of electrons lost to the cathode through the external load. If the amount of electrons gained equals the amount of electrons lost than V equals zero and $E = E_o$.

DETAILED DESCRIPTION OF THE CURVOLT GENERATOR

Figure 4:
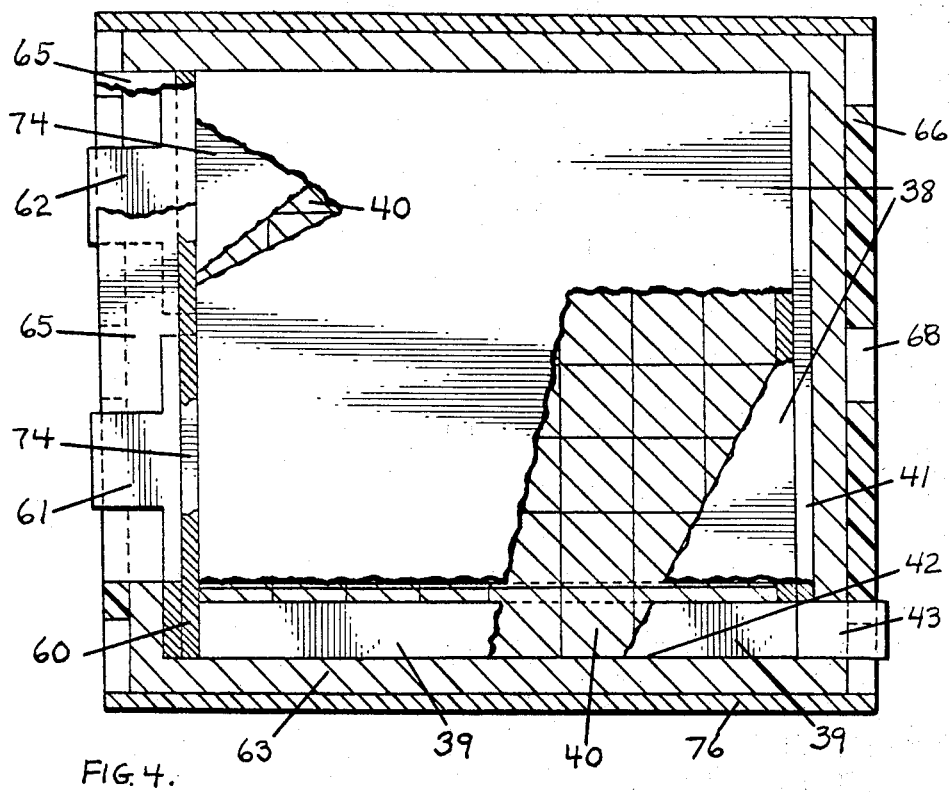
FIG. 4 illustrates the top view of one of the cells in the ferroelectric generator. The top electrodes are cut to show the matrix of ferroelectric square slabs and the next following electrode.

Looking at FIG. 4, the top view of one of the ferroelectric cells is shown. The large electrode has been cut to be able to show the different parts.

Figure 5:
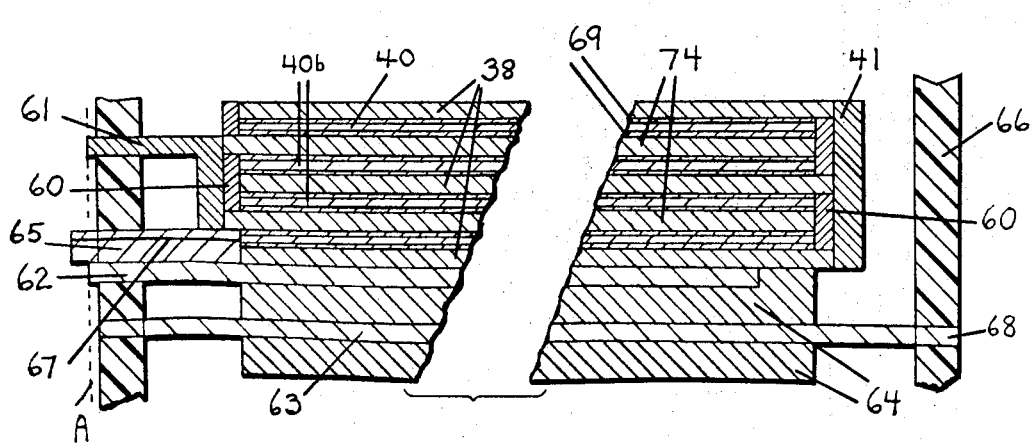
FIG. 5 is a cross-sectional front view, showing only the primary electrode, of one module of the current-voltage generator.
Figure 6:
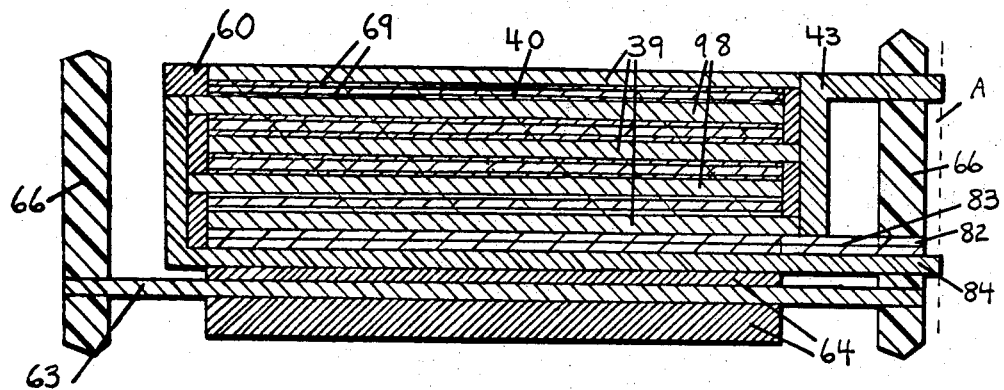
FIG. 6 is a cross-sectional front view of the same module shown in FIG. 5, but this time showing only the secondary electrodes.

The top view of FIG. 4 is the back of the module, which is the stack of ferroelectric cells shown in FIGS. 5 and 6. The bottom of FIG. 4 is the front. Left and right of FIG. 4 are the sides of the module.

Figure 7:
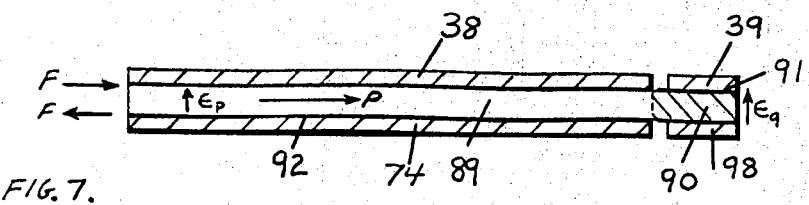
FIG. 7 is a cross-sectional side view, illustrating one ferroelectric cell.

One ferroelectric cell is shown in FIG. 7. FIG. 7 shows the cross-sectional side view and the view of the different parts.

Looking again at FIG. 4 and then FIG. 7, the ferroelectric cell consists of two twin primary electrodes 38 and 74, and two twin secondary electrodes 39 and 98 sharing the same dielectric or ferroelectric matrix 40. Also the primary electrode area is greater than the area of the secondary electrodes 39 and 98. FIG. 4 is showing the top primary electrode 38 of the module. FIG. 4 also shows part of the ferroelectric matrix 40. The ferro-electric matrix 40 is in between the paired primary and secondary electrodes and consists of an array of ferro-electric square plates, shown in FIG. 4 and in FIG. 5 as 40b, and two films 69 of high breakdown strength. The tow coatings or films 69 are of glass or epoxy and are applied after the matrix of ferroelectric square plates has been assembled and glued together to act as the final binder. FIG. 5 shows only the cross section of the ferroelectric square plate array 40b. The matrix 40, which is the combination of the ferroelectric square array 40b and the two dielectric films 69 will act like a single ferroelectric square plate. The matrix 40 can consist of only one square plate, but since a 10 square-inch plate only 10 mils thick is hard to handle, the sealed array of squares are used. The ferroelectric material to be used is lead-zirconate-titanate, although other ferroelectric dielectrics may be used. During the manufacturing process, the ferroelectric square plates are permanently polarized by an application of high voltage, as shown in FIG. 7, perpendicularly from side-to-opposite-side, evenly throughout and parallel to and in the direction of the secondary electrodes 39 and 98. Polarization is designated as P in FIG. 7 and the direction of polarization is shown by the arrow. The ferroelectric squares are aligned so that their polarization P is oriented in the same direction. The result will be a total polarization P, as shown in FIG. 7. Each square is similar to the other. They should be the same in material, properties, thickness, geometry, and including the magnitude of the permanent polarization.

Matrix 40 total polarization will be from the back side of the ferroelectric cell to the front side of the cell. The front edge is designated by 42 in FIG. 4. The matrices in the other cells in the module should be stacked during manufacture so their total polarization bias is of the same direction.

Primary electrodes 38 are electrically connected to tab terminal 41, shown in FIGS. 4 and 5. In this regard, the right sides of the electrodes 38 extend beyond the electrodes 74 for connection to the elongated, vertically extending terminal 41. This is shown in FIG. 5. Only the top primary electrodes 38 is shown in FIG. 4 connected to tab terminal 41. Primary electrodes 74 are electrically connected to tab terminal 61.

Electrical connection of the primary electrodes 38 is made through terminal electrode 62 shown in FIG. 4 and FIG. 5.

The two terminals 61 and 62 are spaced as shown in FIG. 4 and FIG. 5. An electropositive shield 65, shown in FIGS. 5 and 4, separates the terminals as shown and prevents any interference between terminals 61 and 62. The shield is made of any high breakdown strength dielectric, for example, glass. In the middle of the shield 65 is a metal film 67 which is a plane parallel to the two major planes of the shield 65.

Figure 8:
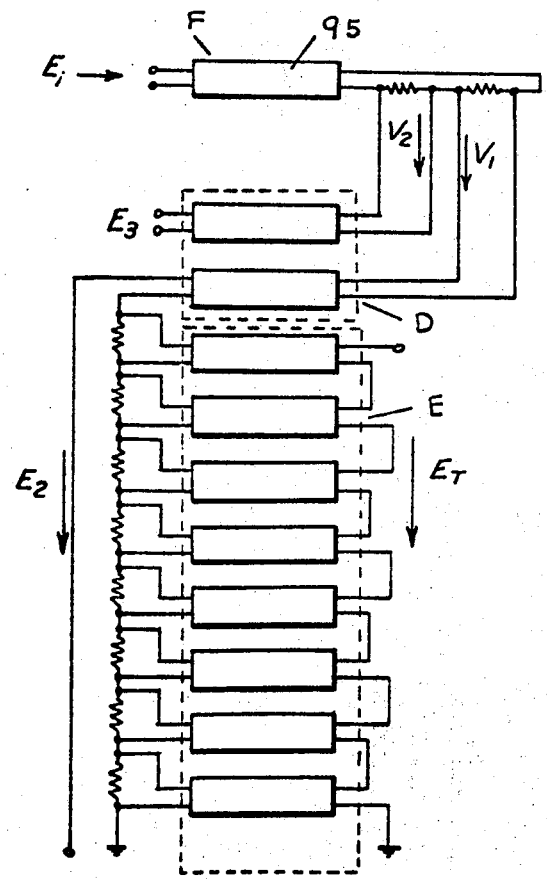
FIG. 8 is a schematic for the current-voltage generator.

The electrical network $B_{in}$ is shown in FIG. 8. Electrical network $B_{in}$ will be on the left side of the module in FIG. 5. Electrical network $B_{out}$ shown in FIG. 8 will be in the right side of module in FIG. 5 and FIG. 6.

Heat generated from the electrical networks $B_{in}$ and $B_{out}$ will be reflected from the modules by heat insulator A, shown in FIG. 1 and in FIG. 5, on the right side, and on the left side in FIG. 6. Heat insulator A, which is also an electrical insulator will cover completely the two sides of the curvolt generator module stack, as shown in FIG. 1.

Looking at FIG. 6, we can see the other cross section of the module just described. FIG. 6 shows the secondary electrode 39 is a cross-sectional front view.

The secondary electrode 39 shown in FIGS. 4 and 6, uses the same ferroelectric matrix 40 that the electrode 38 uses.

As it can be seen in FIG. 4, the secondary electrodes 39 and 98 are all of the same area and geometry, but are smaller in area than the primary electrodes 38 and 74.

Looking at FIG. 6, the secondary electrodes 39 are electrically connected to tab terminal 43. FIG. 4 shows the electrical connection between secondary electrode 39 and tab terminal 43. Secondary electrodes 98 are electrically connected to tab terminal 84. Insulator 60 shown in FIGS. 4 and 6 insulates secondary electrodes 39 from tab terminal 84 and also insulates secondary electrodes 98 from tab terminal 43.

Tab terminal 84 is shielded from secondary electrode 39 and tab terminal 43 by the electrostatic shield and electrical insulator 82 shown in FIG. 6. This shield has two metal films 83 at its center. Electrostatic shield 82 covers the complete area of terminal 84 from terminal 43 and electrode 39.

The ferroelectric stack is separated from the electrostatic shield 63 by electrical insulators 64.

The whole ferroelectric cell pile is bonded to the electric insulator and heat conductor 64 where the insulator 64 is glued to the electrostatic shield and heat conductor 63.

76 in FIG. 4 represents the two-sided metal plates on the front and back of the module. These plates, 76, are painted or electroplated black to serve as emitters of heat produced by the modules. 76 is shown also in FIG. 1.

Insulating layer 60 shown in FIGS. 4 and 5 insulates primary electrodes 38 from tab terminal 61 and electrodes 74, and primary electrodes 74 from tab connection 41 and electrode 38.

The module just described is separated from the other modules by the electrostatic shield and heat conductor 63, shown in FIG. 5. The electrostatic shield 63 is separated from the stack of ferroelectric cells by electric insulators 64, and heat conductors shown in FIG. 5. All these electric insulators 64 have equal length and width and are of the same length and width as the ferroelectric matrices 40.

This electrostatic shield 63 is supported by the plastic encasement plate 66. 68 are the sustaining tabs of the shield 63. These tabs are made a part of shield 63 during manufacture by bonding them to shield 63. Alternatively, shield 63 may be cut to the shape shown with the tabs extending therefrom.

FIGS. 4, 5 and 6 are the different views of one complete ferroelectric module.

It will be necessary to describe the operation of one cell before the description of the whole module.

Functionally, the primary twin electrodes shown in FIG. 7 will receive the high frequency output $V_2 + V_3$ (in FIG. 1 and depicted as $E_i$ in FIG. 8). An oscillating electric field $E_p$ between electrodes 38 and 74 will be produced from input $E_i$. This field $E_p$ will polarize the ferroelectric matrix 40. The area of polarization is the unshaded region 89 in FIG. 7. Since these ferroelectric square plates are permanently polarized from one side to the opposite side and parallel to the electrodes in the direction of the arrow shown in FIG. 7, the applied rising field will distort the cross section of the ferroelectric plates, in region 89, and the twin major faces of the complete ferroelectric matrix will move in opposite directions, equivalent to a sliding parallel over each other with a progressive relative displacement. In other words, the ondulating electric field $E_p$ produced at region 89 is converted into oscillating mechanical energy (oscillating shear stress).

The force generated by the applied field is $$F = LWV/g_{15}T$$

where
$g_{15}$ = piezoelectric voltage coefficient in volt-meters/Newton × $10^{-3}$
$T$ = Thickness in M
$F$ = Force in Newtons
$W$ = Width in meters
$L$ = Length in meters
$LW$ = Area of either primary electrodes 38 and 74 on the matrix (40)
$V/T$ = Field produced by applied voltage The section of the matrix 40 not affected by the applied field and not between the primary paired electrodes, shown as the shaded region 90 in FIG. 7 will receive the sinusoidal shear force F generated by the applied oscillating field $E_p$ from region 89.

Region 90 in FIG. 7 will convert sinusoidal shear force F into a charge at the secondary electrodes 39 and 98. Force generated at region 89 will increase with an increase in applied voltage.

The amount of charge generated is $$Q = Fd_{15}$$

where
$F$ = force in Newtons
$d_{15}$ = piezoelectric charge coefficient in coulombs/Newton × $10^{-12}$ Voltage generated will depend upon the capacitance of the secondary electrodes 39 and 98. The capacitance is when taking into consideration film 69 in FIG. 5 and FIG. 6

$$C_2 = At_o/a/t_{r_{15}} + b/t_{r_2}$$

Disregarding the dielectric coefficient of the voltage breakdown film 69, the capacitance equation is
$C_2 = t_{r_{15}} t_o A/a$
$E_o$ = permitivity of free space
$t_{r_{15}}$ = dielectric coefficient of ferroelectric measured at right angles to the permanent polarization axis
$E_{r_2}$ = dielectric coefficient of voltage breakdown protective film 69
$a$ = thickness of ferroelectric
$b$ = thickness of two films
$A$ = area of electrodes The voltage generated $E_o$ which will be greater than the voltage applied to the primary electrodes 38 and 74 at the secondary electrodes 39 and 98 is $$E_9 = Q_1/C_2$$

$Q_1$ is the charge on the secondary electrodes 39 and 98 is $$Q_1 = \sigma A_s$$

where $A_s$ is the area of either electrode 39 or 98, $\sigma$ is the charge density/$m^2$ of the surface of matrix 40 of region 90. Charge density/$m^2$ is $$\sigma = Q_p/A_m$$

where $Q_p$ is the charge generated at region 90 and $A_m$ is the area of either surface of matrix 40 in region 90.

Voltage generated $E_9$ which will be greater than voltage applied, $E_i$, will depend upon the piezoelectric voltage coefficient $g_{15}$ and on the piezoelectric charge coefficient $d_{15}$ of the material used.

The voltage amplification ratio for voltage input + voltage output will depend upon the piezoelectric voltage coefficient $g_{15}$, on the piezoelectric charge coefficient $d_{15}$ as well as on the area of the primary electrode 38 and 74 in relation to the area of the secondary electrodes 39 and 98.

The reason for this amplification or voltage generation is shown by equation of force generated by applied voltage V, $$F = LWV/g_{15} T$$

$$d_{15} = t_{r_{15}} t_o g_{15}$$

Lets manipulate the equation of force generated per applied voltage to understand the voltage generation of the curvolt generator.

If the area of the primary electrodes is greater than the area of the secondary electrode 39 and 98, the force generated at region 89 by primary electrodes 38 and 74 will be greater than the secondary electrodes 39 and 98 will produce for the same amount of applied voltage at region 90. Therefore, the greater force generated by primary electrodes 38 and 74, at region 89 will not equal the force generated if the same voltage is applied to secondary electrodes 39 and 98, at region 90. Hence, the voltage generated between secondary electrodes 39 and 98 will be greater.

To increase the area of the secondary electrodes 39 and 98 a deposit of silver 91 on the epoxy protective film 69 to form electrodes 39 and 98 should be applied. This is to allow the secondary electrodes 38 and 98 to utilize most of the charge generated at the surfaces of region 90 and facilitate the fabrication of the modules. Also a similar deposit of silver 92 to form primary electrodes should be applied.

Current generation will vary with dielectric coefficient, charge generated and thickness of the ferroelectric matrix 40. Current output will also vary with frequency. In other words, it will vary with the amount of capacitance reactance known as, $$X_L = 1/2\pi fC$$

where $f$ is the frequency in cps and C is the capacitance of the secondary electrodes 39 and 98.

Looking at FIG. 8, the first stage F of the curvolt generator receives the high and low frequency output signal of oscillators 2 and 3, known as $V_2 + V_3$ and $E_i$ in FIG. 8. This input signal is applied to module 95 primary electrodes 38 and 74, which are electrically coupled to oscillators 2 and 3 through tab terminals 61 and 62. As described before, oscillating applied voltage $E_i$ produces an oscillating electric field between primary electrodes 38 and 74. The oscillating field is converted into oscillating shear stress (force F), as described before, of the complete matrixes in the module. Force F is converted into an oscillating voltage between secondary electrodes 39 and 98, by the matrix region between secondary electrodes 39 and 98.

Voltage and current signal output of electrodes 39 and 98 is made through tab terminals 43 and 84.

Signal output from stage F module 95 is divided by the two one ohm resistors. One half of the signal output from stage F will go to each of the two modules in stage D.

Similar voltage and current generation will occur in stage D modules. Further description of the operation of the components in each module is not necessary since each module is equal in operation and in structure.

The output of each of stage D modules is divided into 15 different outputs. This is done, as shown in FIG. 8 by dividing the output voltage $E_2$ and $E_3$ with a series of resistors each of one ohm. The output voltage $E_2$ and $E_3$ of each module divided by 15 is the input to each module in stage E.

Stage E has 30 modules which is the sum of two branches where each branch contains 15 modules. Only part of the electric circuit network of only one branch is shown in the stage E schematic. The other branch circuitry (not shown) is similar.

The individual output of each module in stage E is coupled in series as shown in FIG. 8, giving a total of $E_T$ voltage and current. Voltage can reach up to 67,000 volts, depending upon the voltage-current amplification ratio $V_{out}/V_{in}$ which is equal to gain G per stage. Current can also reach such a magnitude. The equation below summarizes the total voltage output $$V_4 = E_T = (E_i)G^z$$

Where G is the voltage gain for one stage and z is the exponent representing the number of stages, the above equation considers all the stages have the same gain.

Current output is $$I = E_T/X_L$$

Where $X_L$ is the capacitance reactance of the secondary electrodes 39 and 98 of the modules in the last stage, E.

Energy dissipated by the one ohm resistors will be in infrared radiation. The resistors should be of silicon and encased in infrared transparent plastic or glass. Silicon may be used or any other material that will emit infrared radiation as well as silicon does or better.

All the infrared radiating resistors located on the left-hand side circuit network of the drawing in FIG. 8 will be in the input circuit network as shown in FIG. 1, and depicted by $B_{in}$. The output circuit network shown on the right-hand side of FIG. 8 is the circuit network depicted at $B_{out}$ in FIG. 1. Infrared radiation from the curvolt generator resistors will reach the ignition section 1 directly, since the infrared emitting network $B_{in}$ is adjacent to the battery of infrared converters.

This infrared radiation will serve to autostabilize the total output of the contact potential infrared converters and the contact potential generator. The average amount of radiation received by the cells from the curvolt generator will reduce the fluctuating density of incident infrared photons from the environment.

OSCILLATORS

The oscillators, 2 and 3, used should be able to handle up to 300 amps and 20 volts output from the ignition section 1. The oscillators used will be those presently being sold in the market and that can handle this amount of power without being too large and that are of very low input and output impedance.

FREQUENCY SELECTOR

Figure 9:
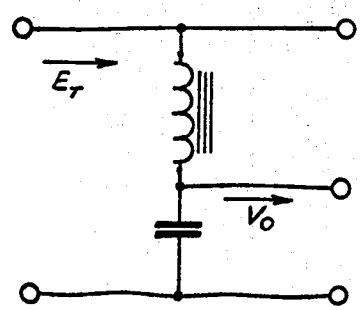
FIG. 9 is a schematic of a common frequency selector circuit recommended for the generator.

The most simple circuitry for the frequency selector will consist of a choke, as shown in FIG. 9 and a capacitor. The amount of capacitance and inductance necessary to be tuned to select the 60 cps frequency from the curvolt generator is $$f = (1/LC)^{1/2}$$

where
$f =$ the desired frequency (60 cps)
$L =$ inductance
$C =$ capacitance

The frequency selector should be able to handle the high power output of the curvolt generator and be small in size.

SUMMARY STATEMENT OF OPERATION OF TOTAL INVENTION

The contact potential generator is a converter of infrared radiation, available in the environment in which it is located, of beta radiation, emitted by radioactive isotope contained within the system, and a converter of piezoelectric energy into electric power.

This is accomplished by having the infrared cells produce a D.C. signal V as shown in FIG. 1. DC signal V is transformed into two high and low frequencies by the oscillators 3 and 2, where the low frequency signal is utilized for the external load of the contact potential generator, and the high frequency signal to decrease the capacitance reactance of the curvolt generator 4 and thereby increase current output.

The two frequencies $V_2$ and $V_3$ are fed into the curvolt generator 4 through the input terminals in $B_{in}$ electric circuit network.

The curvolt generator 4 will generate electric power from the high frequency input of the oscillators through the piezoelectric effect of the ferroelectric cells in the curvolt generator 4.

Infrared output from the electric networks $B_{in}$, emitting resistors, as shown in FIG. 1 (FIG. 1 shows only the top of the curvolt generator and the top of the input electric network $B_{in}$, but the emitting resistors are shown only on the left side of FIG. 8) will stabilize the output of the ignition section 1.

On the other side of the curvolt generator 4 is the heat insulator A, the output electric network $B_{out}$ and the insulator and cooling fins C. Output electric network $B_{out}$ is coupled to the frequency selector 5, as shown in FIG. 1.

The output $V_4$, shown as $E_i$ in FIG. 8, of the curvolt generator 4 is fed into the frequency selector 5, which retrives the 60 cps signal $V_o$, for common use.

I claim:
1. An electric power generator comprising:
electric battery means for generating a low-voltage DC signal;
oscillator means responsive to said low-voltage DC signal for generating an AC signal; and
a current-voltage generator including
a plate-like member of piezoelectric ferro-electric material electrically polarized in a predeter- mined direction substantially parallel to a flat surface thereof, a first pair of relatively large area electrodes on opposite sides of said plate-like member and connected to said oscillator means for receiving said AC signal and generating an electric field transverse to said direction of electric polarization of said plate-like member to produce oscillating shear forces and deformations therein, and a second pair of relatively small area electrodes on opposite sides of said plate-like member adjacent to said first pair of electrodes for applying to an output circuit connected thereto an amplified alternating voltage generated between said second pair of electrodes in response to said oscillating shear forces in said plate-like member.

2. The electric power generator of claim 1 wherein said oscillator means includes first and second oscillators for generating relatively high and relatively low-frequency AC signals which are combined and applied to said first pair of electrodes and wherein said electric power generator further includes frequency selector means connected to said second pair of electrodes for filtering said low-frequency signal from an output signal developed thereat and passing same to said output circuit.

3. The electric power generator of claim 2 wherein said current-voltage generator comprises a stack of a plurality of said first and second pairs of electrodes each on opposite sides of a different plate-like member of piezoelectric ferro-electric material polarized in predetermined direction substantially parallel to a flat surface thereof and each of said second pairs of electrodes being connected in common to said frequency selector means.

4. The electric power generator of claim 1 wherein said battery means comprises a contact potential cell including:

an upper and a lower unit, said upper unit comprising upper plate-like cathode and anode electrodes engaging upper and lower surfaces of an upper semiconductor disc, and a quantity of radioactive material between a portion of said upper cathode and said upper semiconductor disc for emitting beta particles for passing through said upper semiconductor disc to said upper anode, and said lower unit comprising, lower plate-like cathode and anode electrodes engaging upper and lower surfaces of a lower semiconductor disc, and a quantity of radioactive material between a portion of said lower cathode and said lower semiconductor disc for emitting beta particles for passing through said lower semiconductor disc to said lower anode;

means for electrically connecting said upper cathode and said lower anode to said oscillator means; and said upper and lower cathodes having higher work functions than said upper and lower anodes and said upper and lower semiconductor discs having higher work function upper surfaces than engaging lower surfaces of said upper and lower cathodes and lower work function lower surfaces than engaging upper surfaces of said upper and lower anodes whereby electrons are exchanged at said engaging surfaces with said semiconductor discs and flow omnidirectionally from said upper cathode to said lower anode to produce said low-voltage DC signal at said oscillator means.

5. The electric power generator of claim 4 wherein said upper semiconductor disc is thinner than said lower semiconductor disc to pass larger quantities of beta particles to said upper anode than are passed to said lower anode.

6. The electric power generator of claim 4 wherein said current-voltage generator is located immediately adjacent said battery means with an input circuit of said current-voltage generator including input resistor means adjacent said battery means to emit infrared radiation to said battery means.

* * * * *